United States Patent Office 3,663,511
Patented May 16, 1972

3,663,511
POLYURETHANES CHAIN-EXTENDED WITH A HYDROXYL CONTAINING AMIDE CHAIN EXTENDER
Frank G. Lombardi, Clifton, and Fritz Hostettler, Verona, N.J., assignors to Inter-Polymer Corporation, Passaic, N.J.
No Drawing. Continuation of application Ser. No. 734,901, June 6, 1968. This application June 10, 1970, Ser. No. 48,832
Int. Cl. C08g 22/08
U.S. Cl. 260—75 NQ
3 Claims

ABSTRACT OF THE DISCLOSURE

There is disclosed a process for the manufacture of novel chain extenders or mixtures thereof for use in preparing polyurethanes comprising reaction of an aliphatic, cycloaliphatic, heterocyclic, or aromatic diamine or amino alcohol, with from about 1.0 to about 1.5 moles of an epsilon-caprolactone or a 6-hydroxycaproic acid per mole of active amine functional group of said diamine or amino alcohol, at a temperature of from 100 to 300° C., in the presence or absence of a metallic catalyst.

There is further disclosed a process for the manufacture of polyurethane polymers which comprises reacting a member of the group consisting of (a) polyesters prepared from dicarboxylic acids and glycols, (b) polyesters prepared from epsilon-caprolactones or 6-hydroxycaproic acids, or (c) polyethers prepared from 1,2-alkylene oxides and/or tetrahydrofuran, with organic polyisocyanates and a chain extender prepared as described above.

CROSS REFERENCE TO RELATED APPLICATIONS

This application is a continuation of application Ser. No. 734,901, filed June 6, 1968 now abandoned.

BACKGROUND OF THE INVENTION

Field of the invention

This invention relates to methods for the production of novel chain-extenders for use in forming polyurethane elastomers and to the novel products resulting therefrom. This invention also relates to the polymerization of polyesters, polylactones and polyethers by reaction with organic polyisocyanates in the presence of the chain-extenders to produce polyurethane elastomers and the products produced thereby.

Description of the prior art

It is well known that polyesters, polylactones and polyethers can be reacted with organic polyisocyanates in the presence of diamine, amino alcohol, or glycol-type chain-extenders to produce polyurethane elastomers which are useful in an ever-increasing number of areas. For example, polyurethane products produced in this manner have come to be useful as mechanical components in forming seals, bushings, O-rings, and many other variations in a number of diversified industrial areas. Accordingly, there remains a need in the art for low cost efficient procedures by which these materials may be produced.

While it is known to be relatively simple to utilize glycol-type chain-extenders in the formation of urethane elastomers, the utilization of amino alcohols, and particularly of diamines as chain-extenders for the formation of polyurethanes remains a difficult problem. Whereas glycols react with organic polyisocyanates at relatively moderate rates, thereby presenting relatively little difficulty in handling, amino alcohols and particularly diamines, react at much faster rates so that most diamine cures are impractical unless the polymerization reaction is conducted in the presence of powerful solvents such as dimethylformamide dimethylsulfoxide, etc.

In cases where it is desirable to utilize the diamine cure for the manufacture of cast urethane elastomers, the reactivity of the diamine must be reduced drastically in order to obtain practical reaction rates which will allow sufficient pot-life to handle the polymerizing mix prior to casting. In the prior art this has been accomplished by the introduction of negative substituents into the aromatic ring of aromatic diamines. Two products of this type which are finding wide use are 3,3'-dichloro-4,4-biphenylenediamine, and particularly 4,4'-methylenebis (2-chloroaniline.) With these diamines, pot lives on the order of a few minutes are possible. However, the above diamines are high melting which introduces additional handling difficulties. Moreover, diamines of this type are expensive, therefore contributing greatly to increased overall cost of elastomer formulations.

Despite the above difficulties and the high price of such chain-extenders, they are widely utilized on account of the outstanding properties which result in the polyurethanes derived from said aromatic diamine chain-extenders. However, while it is known that diamines such as 4,4'-methylenedianiline, p-phenylenediamine, 1,5-naphthylenediamine and others are also capable of producing high performance polyurethanes, their use is unfortunately not practical for undiluted urethane reactions on account of their very fast reactivity, which results in premature gelation.

It has now been found that aliphatic, cycloaliphatic, heterocyclic, and aromatic diamines and amino alcohols, may be successfully utilized as chain-extenders in urethane reactions, provided that said amine groups are first converted to amide groups by reaction with lactones such as epsilon-caprolactones or hydroxy-acids such as 6-hydroxycaproic acids prior to use, and thus provide a solution to the problems described above.

SUMMARY OF THE INVENTION

It is accordingly one object of the present invention to provide a procedure for the manufacture of chain-extenders which overcomes or otherwise obviates the enumerated problems of the prior art.

A further object of the invention is to provide a procedure for the conversion of hydroxyl-terminated polyesters, polylactones, or polyethers and organic polyisocyanates in combination with the afore-mentioned chain-extenders and to provide polyurethane products therefrom.

Other objects and advantages of the present invention will become apparent as the description thereof proceeds.

In satisfaction of the foregoing objects and advantages there is provided by the process of this invention a procedure for the preparation of low molecular weight chain-extenders, the process comprising heating (1) an aliphatic, cycloaliphatic, heterocyclic, or aromatic diamine or amino alcohol in the presence of an epsilon-caprolactone in an amount sufficient to have at least about 1 mole of epsilon-caprolactone present per amine equivalent of said diamine or amino alcohol at a temperature from about 150° to about 300° C., or (2) an aliphatic, cycloaliphatic, heterocyclic, or aromatic diamine or amino alcohol in the presence of a 6-hydroxycaproic acid in an amount sufficient to have at least about 1 mole of the 6-hydroxycaproic acid present per amine equivalent of said diamine or amino alcohol while removing the resulting water of condensation, at a temperature of from about 100° to about 300° C.

The invention also provides a procedure for the preparation of polyurethane elastomers having excellent properties, which comprises reacting an intermediate comprising a member selected from the group consisting of (a) hydroxyl-terminated polyesters prepared from dicarboxylic acids and glycols, (b) hydroxyl-terminated hydroxyacids or lactone reaction products and (c) hydroxyl-terminated polyethers, or mixtures thereof, with an organic polyisocyanate, and the chain-extenders described as above, the reaction being carried out by contacting the reactants at a temperature ranging from about 20° to about 180° C. either by the "pre-polymer" method or by the "one-shot" technique.

Also provided are the polymeric final products and intermediate products resulting from the above-identified processes.

DESCRIPTION OF THE PREFERRED EMBODIMENTS

In accordance with the present invention, it has been found that the above-described procedures result in the production of polyurethane products having excellent, and in several cases superior, properties compared with those of prior art procedures. Moreover, the pot-life of the urethane casting resins described in the present invention is drastically improved compared with the normally observed short pot-life of conventional diamine chain-extenders.

As indicated, the essence of the invention resides in the discovery that reaction products of epsilon-caprolactones or 6-hydroxycaproic acids with aliphatic, cycloaliphatic, heterocyclic or aromatic diamines or amino alcohols, and particularly the diamines, represent far superior chain-extenders for the manufacture of urethane elastomers than the amino alcohols or diamines themselves.

Thus, according to one aspect of the invention, it has been discovered that chain-extension intermediates, useful for the manufacture of urethane elastomers, may be produced by action of heat, alternatively in the presence or absence of a catalyst, on a mixture of an epsilon-caprolactone and the aliphatic, cycloaliphatic, heterocyclic or aromatic diamine or amino alcohol. A second aspect of the invention resides in the use of said chain-extenders to produce useful polyurethane elastomers.

The first embodiment of the invention comprises the reaction of aliphatic, cycloaliphatic, heterocyclic, or aromatic diamines or amino alcohols with an epsilon-caprolactone or a 6-hydroxycaproic acid at a molar ratio of from about 1 to 1.5 moles of epsilon-caprolactone or 6-hydroxycaproic acid to each equivalent of amine to produce novel intermediates. Contrary to the teachings of the pertinent prior art, particularly U.S. Pat. No. 3,169,945, it has been found, for example, that the amine/epsilon-caprolactone reaction is relatively incomplete unless reaction temperatures of at least 150° C., preferably at least 180° C. are utilized. At temperatures below about 150° C., it has been observed that substantial amounts of free amine groups are present, even when an excess of epsilon-caprolactone, in relation to the amine groups, is utilized. According to this invention it has now been discovered that at temperatures ranging from at least about 150° to as high as about 300° C., the reaction, as far as conversion of the amine groups to amide groups is concerned, is much more nearly complete, although it has been found that there is usually a finite, but relatively small amount of unreacted amine groups present. A preferred reaction temperature range for the amino alcohol or diamine/epsilon-caprolactone reaction is from about 180° to about 250° C. The amount of free amine groups present after conducting the reaction at these elevated temperatures is sufficiently low to assure long pot-life in the subsequent reaction for the manufacture of polyurethane elastomers.

The reaction of the amino alcohol or diamine with the epsilon-caprolactone or 6-hydroxycaproic acid may be conducted in the presence or absence of a catalyst. When a catalyst is to be used however, it has been found that catalysts which are suitable for the reaction are the ester interchange catalysts such as tetraalkyl titanates, stannous acylates, lead acylates, and many others which are well known in the polyester art.

When a catalyst is employed, a catalyst concentration of from about 5 parts per million based upon the amounts of reactants up to as high as about 0.1% or more based upon the reactant amounts is sufficient. A desirable aspect of the invention however, is to carry out the reaction of the amino alcohol or diamine with the epsilon-caprolactone or 6-hydroxycaproic acid in the absence of catalyst, particularly when the reactant chain-extender is to be utilized in combination with fast-reacting organic polyisocyanates. In such cases, absence of a metallic catalyst lengthens the pot-life of the elastomer reaction appreciably.

It has also been observed that addition of a minor amount of water, for example, in the range of 0.05 to 0.5% of water based upon the amounts of the reactants present present has a beneficial effect upon the rate and completion of the reaction.

The reaction of the amino alcohol or diamine with the 6-hydroxycaproic acids also yields the desired chain-extension products under generally the same conditions. In this case however, water of condensation is eliminated during the reaction in order to enable the reaction to go to completion by shifting the equilibrium and the hydroxyl-containing amide is formed at reaction temperatures of from about 100° to as high as 300° C. A preferred temperature range is from about 100° to about 250° C.

The amino alcohols and diamines which may be employed in the reaction include all such compounds generally known in the art and particularly those described hereinbelow.

Of the amino alcohol reactants, there may be mentioned the aliphatic amino alcohols of the formula $$HO(CH_2)_nNH_2$$

wherein $n$ is an integer of about 2 to 10, such as 6-aminohexanol, ethanolamine, propanolamine and the like as well as other common aliphatic amino alcohols such as isopropanolamine, N-methyl ethanolamine, N-methyl isopropanolamine and equivalent reactants. In addition, aromatic, cycloaliphatic and heterocyclic amino alcohols may be utilized such as p-amino-phenethyl alcohol, p-amino-alpha-methylbenzyl alcohol, 4-aminocyclohexanol, mono-2-hydroxyethyl piperazines and equivalent amino alcohols of this type.

The diamines which may be used include aliphatic diamines of the general formula $H_2N(CH_2)_nNH_2$, mono-secondary diamines of the general formula $$RNH(CH_2)_nNH_2$$

and di-secondary diamines of the general formula $RNH(CH_2)_nNHR$, where $n$ is an integer of 2 to 10 and R is alkyl; cycloaliphatic diamines such as 1,4-cyclohexanediamine, 4,4-methylenebiscyclohexylamine, and 4,4'-isopropylidenebiscyclohexylamine; heterocyclic amines such as piperazine, 2,5-dimethylpiperazine, and 1,4-bis(3-aminopropyl) piperazine; aromatic diamines such as m-phenylenediamine, p-phenylenediamine, toluene-2,4-diamine, toluene-2,6-diamine, m- and p-xylylenediamines, 1,5-naphthalenediamine, benzidine, 3,3'-dimethyl-4,4'-biphenylenediamine, 3,3' - dimethoxy - 4,4' - biphenylenediamine, 4,4' - methylendianiline, 4,4' - ethylenedianiline, 2,3,5,6-tetramethyl-p-phenylenediamine, and 2,5- and 2,7-fluorenediamines. Obviously equivalent diamines and amino alcohols may also be employed.

The lactones which are utilized in the invention comprise epsilon-caprolactone and the lower alkyl-substituted derivatives such as epsilon-caprolactones substituted with one or two methyl groups. The 6-hydroxycaproic acids which are used are those corresponding to the lactones and which can also be derived from the lactones as by hydrolysis.

The process is conducted by mixing the diamine or aminoalcohol and the epsilon-caprolactone or 6-hydroxycaproic acid in the molar relations delineated above and adding the water and catalyst thereto if these components are to be employed in the reaction. Thereafter, the mixture is heated at the required temperature for the respective lactone or hydroxy acid reactant under an inert atmosphere such as a stream of nitrogen, until the reaction is complete. After cooling the mixture to about 100° to 125° C., samples may be taken to determine the hydroxyl number of the products by reaction with phthalic anhydride in pyridine by known methods.

The products resulting from this reaction may be characterized as amide group-containing reaction products, the products being hydroxyl-terminated by reason of substantially all the amino groups present in the amine reactant having reacted with the carboxylic acid group of the lactone or caproic acid molecule.

In the second embodiment of the invention, wherein the chain-extender intermediates described above are reacted with isocyanate-terminated prepolymers from organic polyisocyanates and hydroxyl-terminated polyesters, hydroxyl-terminated polylactones or polyhydroxycaproic acids, or hydroxyl-terminated polyethers, it has surprisingly been discovered that very extended pot-life is observed when the reaction is carried out with the hydroxyl-terminated extenders of the invention. In contrast thereto, when the corresponding amino alcohols or amine extenders are utilized without prior reaction with epsilon-caprolactones or 6-hydroxycaproic acids, pot-life of the urethane reaction becomes so short, that their use is essentially impractical. This is particularly the case with diamine extenders and to a lesser extent also with amino alcohol extenders.

In an alternative of this embodiment of the invention, the chain-extenders of the invention are mixed with a hydroxyl-terminated polyester, hydroxyl-terminated polylactone or hydroxy acids or hydroxyl-terminated polyethers, and then reacted with an organic polyisocyanate, according to the so-called "one-shot" technique for the formation of urethane elastomers or urethane injection-molding resins, or alternately microcellular elastomers by addition of minor amounts of blowing agents.

In the "pre-polymer" embodiment of the invention, the chain-extender and the isocyanate-terminated prepolymer, or the chain-extender mixed with the hydroxyl-terminated polyester, polylactone, polyether and the organic polyisocyanate, are reacted at temperatures from about room temperature up to about 180° C. or higher. A preferred temperature range is from about 50° to 150° C. with a most preferred temperature range of from 70° to about 130° C.

The reaction of the chain-extender or of the chain-extender polyol mix with the isocyanate-terminated prepolymer or organic polyisocyanate may be conducted without a catalyst, or if desirable, in the presence of a catalyst. Among the many catalysts known for these types of isocyanate reactions are tertiary amines such as N,N,N',N'-tetramethyl-1,3-butanediamine, N-alkyl morpholines, triethylenediamine, N-alkyl piperazines as well as other known amines; metallic catalysts such as lead octoate and other lead compounds such as lead borate, stannous acylates, dialkyltin diacylates and many other tin compounds, tetraalkyl titanates, as well as other metallic catalysts which are known in the polyurethane art.

It is further within the scope of the invention to utilize varying amounts of polyfunctional low molecular weight polyol extenders in admixture with the chain-extenders of the present invention. Typical examples of such extenders are 1,4-butanediol, 1,6-hexanediol, trimethylolpropane, 1,2,6-hexanetriol, bis(2-hydroxyethyl) hydroquinone, as well as other known diols, triols, tetrols and higher polyols of this type.

The hydroxyl-terminated polyesters, polylactones or polyhydroxy acids and polyethers employed in this embodiment are well known in the art and are preferably, difunctional and possess molecular weights of from about 400 to 3500, preferably from 500 to about 2500. Also mixtures of these compounds may be employed as desired.

The hydroxyl-terminated polyesters may, for example, be prepared by reaction of dicarboxylic acids or anhydrides with glycols by known methods. Any suitable dicarboxylic acid may be used, such as for example, succinic acid, glutaric acid, adipic acid, pimelic acid, azelaic acid, sebacic acid, fumaric acid, phthalic acids, or mixtures thereof. Suitable glycols include ethylene glycol, propylene glycol, 1,4-butanediol, 1,3-butylene glycol, 1,5-pentanediol, 1,6-hexanediol, neopentylene glycol, diethylene glycol, dipropylene glycol, or mixtures thereof.

Hydroxyl-terminated polylactones suitable for the process of the present invention are described in U.S. Pat. No. 3,169,945 and are generally prepared by reaction of the lactone with the desired polyol or polyol mixture.

Hydroxyl-terminated 6-hydroxycaproic acids and oligomers thereof suitable for the process of the present invention are described in our copending application Ser. No. 715,139, and are generally prepared by reacting a suitable chain-stopper, for example a glycol, with the 6-hydroxycaproic acid mixtures or with an alkyl ester of a 6-hydroxycaproic acid.

Suitable polyalkylene ether glycols are, by way of example, those derived from propylene oxide, ethylene oxide, tetrahydrofuran, or mixtures thereof. The polyalkylene ether glycols are either viscous liquids or waxy solids. Polytetramethylene ether glycols, polypropylene ether glycols, or copolymers such as polypropylene/ethylene ether glycols are preferred. All of these polyethers are well known in the art and need not be described herein.

The average molecular weight and reactivity of the polyesters, polylactones and polyethers can be readily determined by analysis for hydroxyl and carboxyl content. The acid or carboxyl number (mg. of KOH per gram of polyol using phenolphthalein as an indicator) is a measure of the number of terminal carboxyl groups. The hydroxyl number, which is a measure of the number of terminal hydroxyl groups, is defined in terms of mg. of KOH per gram of polyol and is determined by adding pyridine and acetic or phthalic anhydride to the polyol and titrating the carboxylic acid formed with KOH. The sum of acid or carboxyl number and the hydroxyl number, referred to as the reactive number, is an indication of the average number of terminal groups present in the polyol and, therefore, is, in turn, an indication of the degree of polymerization. Molecular weight can readily be calculated from the hydroxyl and carboxyl numbers by reference to the formula:

$$M.W. = \frac{\text{Functionality} \times 1000 \times 56.1}{\text{OH number} + \text{COOH number}}$$

The reactant ratio between the hydroxyl end-group containing ingredients (hydroxyl-terminated polyesters, polylactones or polyhydroxy acids, polyethers and chain-extenders) and the organic diisocyanate is critical and should be held within certain limits. Thus, the ratio of NCO equivalents to the sum of hydroxyl equivalents should be held within 0.9 to about 1.3, preferably between about 0.95 to 1.15. This applies whether the elastomers are prepared by the "one-shot" technique or by the "pre-polymer" technique. However, in the latter case, only the reactive equivalents of the NCO-terminated prepolymer and the hydroxyl-terminated chain-extenders are considered for the purpose of the calculation.

The organic polyisocyanates useful for the present process include particularly aliphatic and aromatic diisocyanates such as those listed in Siefken, Annalen 562, page 75 (1949). Exemplary diisocyanates are 1,4-tetramethylene diisocyanate, 1,6-hexamethylene diisocyanate, 2,4- and 2,6-toluene diisocyanates or mixtures thereof, 4,4'-diphenylmethane diisocyanate, 3,3-dimethyl-4,4'-biphenylene diisocyanate, 1,5-naphthalene diisocyanate, m- and p-xylylene diisocyanates, 4,4'-diphenylmethane diisocyanates, for example, in the form of mixtures of 4,4'-diphenylmethane diisocyanate and its carbodiimides.

The amount of chain-extender employed in the formulation ranges from about 5 to 25% of the total weight of the formulation, the amount used being dependent on the desired hardness of the final products. This is of course well known in the art.

The amount of polyesters, polylactone or polyether employed in the formulation is about 45 to 70 weight percent of the total weight of the formulation. A preferred amount is about 50 to 60 weight percent of the total weight of the formulation.

The amount of organic polyisocyanate employed is dependent in part upon such factors as the nature of the reactants, nature of the end-use for the polyurethane products and the like. In general, however, the total isocyanate equivalent to total reactive hydrogen equivalent (i.e. total equivalent of alcoholic hydroxyl plus water, if water is employed in the formulation) is ordinarily that amount required to provide enough isocyanate equivalents to react with all reactive hydrogen equivalents present. Preferably the ratio of isocyanate equivalents to reactive hydrogen equivalents is about 0.9 to 1.3-NCO equivalents per reactive hydrogen equivalent as pointed out above. Also, as indicated above, this ratio is a critical factor in obtaining elastomers having optimum properties.

The catalysts are employed in small amounts, if used, for example, from about 0.001 percent to about 1.0 percent based on the total weight of the reaction mixture.

In producing the elastomers of this invention by the "pre-polymer" method, a pre-polymer is initially prepared by reaction of the polyester, polylactone or polyether and desired isocyanate at the designated temperature of about 50° to 125° C. under an inert atmosphere such as by use of nitrogen or other inert gas. The resulting "pre-polymer" is then heated to a temperature of about 50° to 100° C., and admixed with the previously prepared chain-extender. The reactants are then heated at a temperature of about 50° to 150° C. as described above to effect the reaction.

In the "one-shot" technique, the polyester, polylactone, or polyether and chain-extender are mixed, preheated to a temperature of about 50° to 100° C., and the isocyanate, which may be preheated if desired, is added thereto. During the addition, the mixture should be subjected to a slight vacuum of about 2 mm. Hg to effect degassing. After completion of the addition, the reacting mixture may be cast as desired.

If the process is performed by means of a continuous casting machine, the reactants are degassed prior to entering the mixing head of said machine.

A preferred method of casting is to cast the reaction mixtures into molds which may or may not have been pre-heated and cured as desired after the casting step is completed.

The resulting elastomers have been found to exhibit excellent physical properties as clearly shown hereinafter. In addition the polyurethane elastomers exhibit superior pot-life values.

If it is desired to prepare a foam from this formulation, foaming of this formulation can be accomplished by employing a small amount of water in the reaction mixture (for example, from about 0.05 to 5.0 weight percent of water based on the total weight of the reaction mixture) or through the use of blowing or foaming agents which are vaporized by the exotherm of the isocyanate-hydroxyl reaction or by combination of the two methods. All of these methods are well known in the art. The preferred blowing agents are certain halogen substituted aliphatic hydrocarbons which have boiling points between about —40° C. and 70° C. and which vaporize at or below the temperature of the foaming mass. These blowing agents include for example trichloromonofluoromethane, dichlorodifluoromethane, dichloromonofluoromethane, dichloromethane, trichloromethane, chloromethane, 1,1-dichloro-1-fluoroethane and the like. Other useful blowing agents include low boiling hydrocarbons such as butane, pentane, hexane and the like as well as carbon dioxide. A preferred class of blowing agents which may be used in the formulation of this invention are the materials sold as fluorocarbons under the trade name Freon. Preferred foaming agents are mixtures of water and the fluorinated compounds.

The amount of foaming agent used will vary with the density desired in the foamed product. In general, it may be stated that for 100 grams of reaction mixture containing an average of NCO—OH ratio of about 1:1, about 0.005 to 0.3 mole of gas should be used to provide densities ranging from 45 to 1 pounds per cubic foot respectively.

It is also within the scope of this invention to include foam stabilizers or compounds which control cell size, for example, siloxaneoxyalkylene copolymer surfactant systems but inclusion of such materials is not necessarily required. Exemplary of such compounds are, "Silicone L-520" and the like. The amount of siloxane-oxyalkylene copolymer normally employed by the prior art in emulsifier systems for producing foams of good stability are amounts ranging from about 0.10 to 1.0 percent by weight based on the weight of the total formulation.

It is of course within the scope of the present invention to add fillers, such as clays or diatomaceous earths, to the formulations in quantities up to about 50 percent by weight, based on weight of total ingredients. Dyes may also be added and are often desirable.

The following examples will serve to further illustrate the advantages of the invention but are not to be considered as limitative thereon.

In the following examples, the parts of each component are by weight unless otherwise indicated.

EXAMPLE 1

(A) One mole of ethanolamine (61 grams), is mixed with 1.1 moles of epsilon-caprolactone (125.5 grams) and 0.2 ml. of water and heated to a temperature of 195° C. for a period of 5 hours under an atmosphere of nitrogen. After cooling to 120° C., a sample of the reaction product shows a hydroxyl number of 590, as determined by reacting with phthalic anhydride in pyridine (theory: 601.6).

(B) A prepolymer is prepared by reacting 200 grams of a polypropylene ether glycol having a hydroxyl number of 109.5 with 70 grams of 2,4-toluene diisocyanate at a temperature of 70–80° C. under an atmosphere of nitrogen for 3 hours. The resulting prepolymer has a free NCO content of 6.1%, as determined by reaction with n-dibutylamine and titration of the excess secondary amine with hydrochloric acid.

(C) One hundred grams of the prepolymer from B is heated to 60° C. and admixed with 12.6 grams of the chain-extender reaction product of ethanolamine and epsilon-caprolactone from A (NCO index 1.1) which is held at a temperature of 150° C. The reactants are then agitated for several minutes and then cast into an elastomer exhibiting high strength upon further cure for several days at room temperature.

(D) When 100 grams of the above prepolymer are reacted with 4.0 grams of unreacted ethanolamine (NCO index=1.1), the reactant mixture gels almost instantly and cannot be handled by the conventional casting technique for delivery to an appropriate mold. This illustrates the beneficial effect upon pot-life observed with the amino alcohol-epsilon-caprolactone adduct prepared in A.

EXAMPLE 2

(A) One mole of hexamethylenediamine (116 grams) is mixed with 2.3 moles of epsilon-caprolactone (262 grams) and heated to 220° C. for a period of 5 hours in an atmosphere of nitrogen. After cooling to 120° C., a sample of the resulting reaction product shows a hydroxyl value of 285, as determined by reacting with phthalic anhydride in pyridine (theory: 296.4).

(B) A prepolymer is then prepared by reacting 200 grams of a polyester prepared from adipic acid and ethylene glycol, and having a hydroxyl number of 55.0, with 56 grams of 4,4'-diphenylmethane diisocyanate at a temperature of 70° C. for a period of 3 hours under an atmosphere of nitrogen. The resulting prepolymer exhibits an NCO content of 3.2%.

(C) One hundred grams of the prepolymer from B is then heated to 65° C. and a total of 9.7 grams of the above prepared hexamethylenediamine epsilon-caprolactone reaction product from A (in the molten state at 120° C.) is added and the reactants are mixed thoroughly (NCO index: 1.05). After one minute mixing, the resulting elastomer can still be transferred into a mold. After further cure at room temperature for one week, the elastomer exhibits excellent strength.

(D) When 100 grams of the above prepolymer are reacted with 4.0 grams of unreacted hexamethylenediamine (NCO index: 1.05) at 65° C., the mixture gels immediately even before proper mixing can be accomplished, illustrating that the hexamethylenediamine must be converted to a less reactive species before it may be used as a chain-extender.

EXAMPLE 3

(A) One mole of p-phenylenediamine (108 grams) is mixed with 2.5 moles of epsilon-caprolactone (285 grams) and heated to a temperature of 250° C., 5 parts per million stannous octoate catalyst is added and the reaction is continued for 2.5 hours. After cooling to 105° C., a sample of the resulting reaction product shows a hydroxyl value of 286, as determined by reaction with phthalic anhydride in pyridine (theory: 285).

(B) 100 grams of an isocyanate-terminated product available under the trademark "Adiprene L-167" based on tolylene diisocyanate and a polytetramethylene ether glycol having a free NCO content of 6.2 percent, are heated to 85° C. and intimately mixed with 28.7 grams of the p-phenylenediamine epsilon-caprolactone adduct from A (Hydroxyl No. 286), which is preheated to 105° C., for a period of two minutes. During this time, the reactants are subjected to a vacuum of 2 mm. Hg to effect degassing of the mixture before casting. The reacting mixture is then cast into a metal mold which is preheated to 100° C. The mold is then closed and held at a temperature of 120° C. for a period of one hour, whereupon the elastomer is removed from the mold and cured for an additional 16 hours in a hot air circulating oven at 100° C.

The physical properties of the elastomer were determined after an additional post-cure of one week at ambient conditions.

TABLE I

| Property | Result | ASTM method |
|---|---|---|
| Shore hardness | 75 A. | D 1484-59. |
| Modulus: | | |
| 100% elongation | 316 p.s.i. | D 412-61 T. |
| 300% elongation | 1,263 p.s.i. | D 412-61 T. |
| Tear strength | 216 p.s.i. | D 624-54 Die C. |
| Ultimate strength | 2,368 p.s.i. | D 412-61 T. |
| Ultimate elongation | 490% | D 412-61 T. |

EXAMPLE 4

(A) One mole of 4,4' - methylenedianiline (198 grams), is mixed with 2.1 moles of epsilon-caprolactone (239 grams), and heated to a temperature of 240° C. 5 parts per million stannous octoate catalyst is then added and the reaction continued for 2.5 hours. After cooling to 135° C., a sample of the resulting reaction product shows a hydroxyl value of 281, as determined by reaction with phthalic anhydride in pyridine (theory: 256).

(B) 74.8 grams of epsilon-caprolactone diol, available under the trademark "NIAX" polyol D-520, having a molecular weight of about 823 is reacted with 31.6 grams of an 80:20 mixture of 2,4- and 2,6-tolylene diisocyanate at 95° C. for a period of 1 hour under an atmosphere of dry nitrogen. Upon analysis, the resulting isocyanate-terminated polymer is found to contain 7% NCO by weight.

(C) An elastomer is then prepared according to the procedure described in Example 3-B by reacting 106 grams of the aforementioned isocyanate-terminated prepolymer with 36 grams of the epsilon-caprolactone adduct of 4,4-methylenedianiline (hydroxyl number 281) described in A above. After proper cure of the elastomer and standing thereof at ambient conditions for a period of one week the following properties were observed.

TABLE II

| Property | Result | ASTM method |
|---|---|---|
| Shore hardness | 80 A. | D 1484-59. |
| Modulus: | | |
| 100% elongation | 519 p.s.i. | D 412-61 T. |
| 300% elongation | 3,428 p.s.i. | D 412-61 T. |
| Ultimate strength | 6,129 p.s.i. | D 412-61 T. |
| Ultimate elongation | 375% | D 412-61 T. |
| Tear strength | 276 p.s.i. | D 624-54 Die C. |

EXAMPLE 5

A total of 97.7 grams of toluene - 2,4 - diamine and 228 grams of epsilon-caprolactone is heated at 175°–185° C. under an atmosphere of nitrogen for a period of 16 hours. The resulting adduct has a hydroxyl value of 283.2 as determined by phthalic anhydride in pyridine.

The above diol is an efficient chain-extender for the formation of urethane elastomers when utilized in the manner described in Examples 1 to 4.

Variations on the invention which are obvious to those skilled in the art can be made in accordance with the teachings of the instant specification without departing from the spirit and scope thereof. Accordingly, all such obvious variations are considered to be within the scope of the present invention.

What is claimed is:

1. The polyurethane elastomers produced in accordance with the process which comprises reacting (a) hydroxyl-terminated polymers having a molecular weight of from 400 to about 3500, said hydroxyl-terminated polymers being of the group consisting of (i) polyesters prepared from dicarboxylic acids and glycols, (ii) polyesters prepared from epsilon-caprolactone or 6-hydroxy-caproic acids, and (iii) polyethers prepared from 1,2-alkylene oxides or tetrahydrofuran; (b) an aromatic diisocyanate; and (c) a hydroxyl-containing amide chain extender prepared via the reaction, at a temperature of from 100° to 300° C., of an amino alcohol, an aliphatic diamine, or a cycloaliphatic diamine, with up to about 1.5 moles of epsilon-caprolactone or 6-hydroxycaproic acid per mole of active amine functional group of said diamine or amino alcohol.

2. The polyurethane elastomers produced in accordance with claim 1 wherein said aromatic diisocyanate is 4,4-diphenylmethane diisocyanate or toluene diisocyanate.

3. The polyurethane elastomers produced in accordance with claim 1 wherein said hydroxylterminated polymers have a molecular weight range of from 500 to about 2500; and wherein from about 1.0 to about 1.5 moles of epsilon-caprolactone or 6-hydroxycaproic acid per mole of active amine functional group of said amino alchol, aliphatic diamine, or cycloaliphatic diamine, is used to prepare said hydroxyl-terminated amide chain extender.

References Cited

UNITED STATES PATENTS 2,933,477 4/1960 Hostettler.
3,428,710 2/1969 Daumiller et al.

DONALD E. CZAJA, Primary Examiner

H. S. COCKERAM, Assistant Examiner

U.S. Cl. X.R.

260—2.5 AV, 2.5 AQ, 77.5 AN, 77.5 AQ, 78.3